March 29, 1966 A. GUILLANT 3,242,792
OPTICAL INSTRUMENT WITH LIQUID MIRROR FOR LOCATING GROUND
POINT VERTICALLY ALIGNED WITH OVERHEAD SIGHTING POINT
Filed Sept. 28, 1962
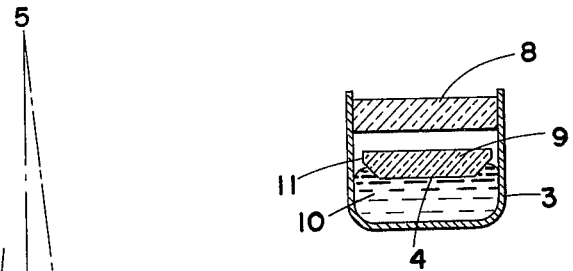
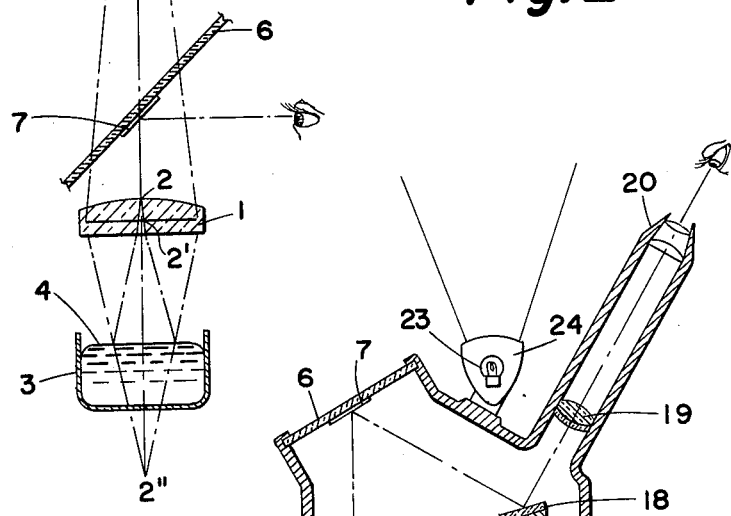
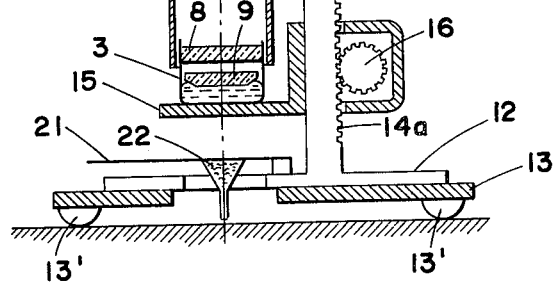

United States Patent Office 3,242,792
Patented Mar. 29, 1966

3,242,792
OPTICAL INSTRUMENT WITH LIQUID MIRROR FOR LOCATING GROUND POINT VERTICALLY ALIGNED WITH OVERHEAD SIGHTING POINT
André Guillant, Paris, France, assignor to Optique et Precision de Levallois, Levallois-Perret-Seine, France, a company of France
Filed Sept. 28, 1962, Ser. No. 226,793
Claims priority, application France, Oct. 11, 1961, 875,656
6 Claims. (Cl. 88—2.3)

During the course of certain operations such as for example the erection of a metal framework or the checking of the forms of an aircraft, it is often required to know the projection on a horizontal plane, in general the ground, of characteristic points of the construction in order to verify the conformity of the construction with the working drawings.

The method generally employed consists in suspending from each of the points to be projected on the ground a plumb line, the length of which is adjusted in order that the lower extremity of the weight comes to within a few millimetres of the ground. A mark is then made opposite this extremity and the measurement of the distances between the marks, or the difference between the marks and a previously prepared outline enables the constructional tolerances to be verified.

The drawbacks of this method are as follows: the necessity of climbing on the construction or to erect scaffolding for the fixing and the adjustment of the plumb lines; oscillation of the pendulum constituted by the plumb line, taking a long time to stop and thereby resulting in a substantial loss of time; and finally sensitivity to wind if the operation is carried out outside and to the inevitable draughts in a workshop or an aircraft hangar.

The present invention relates to a method and an apparatus which permit the above-mentioned drawbacks to be substantially obviated.

In accordance with the invention, in order to obtain the vertical projection of an object point, a vertical optical axis is determined by a reference point coupled to an objective and the image of this point by reflection on a horizontal plane mirror constituted by the free surface of a suitable liquid. The optical system composed of the said objective and the said mirror is brought substantially vertically under the object point so as to obtain an image of the object point which is reflected by the plane mirror. The optical system is adjusted in such manner that the reflected image of the point is substantially in the horizontal plane of the reference point. The optical system is moved laterally so as to cause the reflected image to coincide with the reference point and in consequence to cause the vertical optical axis of the optical system to pass through the object point. The trace of the vertical axis is then marked on the plane of projection by means coupled to the optical system.

An apparatus for carrying the method into effect will essentially comprise an objective to which is connected a reference point materialized for example by the intersection of the wires of a reticule, a receptacle placed under the objective and containing a liquid the free surface of which constitutes a horizontal plane mirror, means permitting the distance between the objective and the receptacle to be varied, means permitting the trace to be marked on a plane of projection of the vertical optical axis formed by the reference point and its image by reflection on the surface of the liquid, and means permitting the observation of the point of reference and the image of the object point.

According to a particularly advantageous form of embodiment, there is chosen as the point of reference the nodal object point of the objective. In this way, it is not necessary to adjust the verticality of the apparatus itself.

According to a particular feature of the invention, the receptacle containing the liquid, in particular mercury, is made airtight by a glass cover with parallel faces. In addition, according to a further feature of the invention, there is placed on the liquid a floater constituted by a glass sheet with parallel faces, so that the horizontal plane which forms the plane mirror is constituted by the liquid-glass separation. This sheet is preferably provided with a chamfer intended to improve the damping of the liquid.

An apparatus of this kind thus enables the vertical of a point to be established by working from the ground. In addition, as a result of the presence of the sheet with parallel faces floating on the liquid, the oscillations of the liquid are rapidly damped, which permits time to be saved as compared with the plumb line methods previously used. Finally, the apparatus is insensitive to wind or currents of air, which also improves the accuracy of operation.

It may also be noted that an optical sighting device according to the invention is of simple construction and in consequence relatively cheap, and that its utilization is simple because its emplacement, when the nodal object point of the objective is chosen by construction as the point of reference, does not require any adjustment.

Other advantages and particular features of the invention will become apparent during the course of the description which follows below with reference to the accompanying drawings given by way of example and without implied limitation, and in which:

FIG. 1 represents the diagram of an optical device, the axis of which is always vertical;

FIG. 2 shows the damping system of the reference device of FIG. 1;

FIG. 3 shows the application of the arrangements of FIGS. 1 and 2 to a sighting device permitting the projection on the ground of a point located above the sighter.

In FIG. 1, there is designated by 1 a convergent lens, the nodal object point 2 of which is located on an accessible face; during the construction of the lens, there can be engraved on this face a reticule composed, for example, of two lines, the intersection of which coincides with the nodal point.

The lens 1 gives an image 2' of the point 2 which constitutes the nodal image point.

Below the lens 1 is placed a receptacle 3 containing mercury, the free surface 4 of which constitutes a horizontal plane reference mirror. This mirror gives an image 2" of 2' which is symmetrical with 2' with respect to the plane 4. The optical axis of the system is defined by the image 2" and the image nodal point 2'; the result is that this optical axis perpendicular to the horizontal plane 4 is vertical.

If the image of a point 5 given by the lens 1 is formed first of all at 2" and then at 2' after reflection on the mercury surface, it follows that the point 5 is on the vertical line passing through the conjugate point 2" of the reticule 2.

In order to be able to observe the reticule which has its lines intersecting at 2 and the image of the object 5, there is placed at 6, above the lens, an oblique partial-mirror which sends the rays of light towards the observer. This mirror 6 may either be semitransparent or it may comprise a small reflecting zone 7 which deflects only a fraction of the rays issuing from the object 5.

The focussing of the object 5 on the reticule 2 is effected by vertical displacement of the receptacle containing the mercury with respect to the lens.

The horizontal plane obtained by a free surface of mercury has however a certain number of drawbacks.

Thus, displacements and vibrations produce waves on the surface of the mercury. In addition, the surface of the mercury oxidizes in air and it would be necessary to filter it frequently. Finally, a device of this kind would be difficult to transport.

In consequence, the following arrangements have been adopted, as shown in FIG. 2.

The mercury is contained in a receptacle 3 which is made airtight by a glass cover 8 with parallel faces. On the mercury has been placed a floated consisting of a glass plate 9 with parallel faces. The horizontal reference plane is then constituted by the mercury-glass separation surface 4.

In order to improve the damping, it is advantageous to provide the floating plate with a chamfer 10. In addition, there is provided between the lateral portion 11 of the floating plate 9 and the wall of the receptacle 3 only a very small clearance which however ensures the complete freedom of the plate.

By way of example, an apparatus utilizing these principles is shown in FIG. 3.

This apparatus comprises a base 12 sliding freely on a sole-plate 13 which rests on the ground through the intermediary of three points 13′.

A pillar 14 rigidly fixed on the base 12, comprises a portion 14a which is cut as a toothed rack. The receptacle 3 containing the mercury rests on a bracket 15 carried by the pillar and adapted to slide along the said pillar by the action of a pinion 16 in engagement with the toothed rack 14a. This pinion, the shaft of which is rigidly fixed to the bracket 15, is moved by an adjusting knob (not shown) keyed on its shaft.

A casing 17 fixed on the top of the pillar 14 comprises the following optical elements: the lens 1 provided with the reticule 2 at its nodal point; the oblique mirror 6 with its metallized zone 7, an observation sighting tube constituted by a return mirror 18, a lens 19, and an eyepiece 20. This latter assembly has the purpose of giving an additional magnification enabling the accuracy of the sighting to be increased and the operator to be placed in a convenient position.

During use, the apparatus thus described is placed below the point to be projected, an assembly rivet for example. The operator looks through the eye piece 20 and carries out the focussing by means of the toothed rack system 16, 14a. The image of the rivet becomes apparent to him in the vicinity of the reticule 2; by means of a sideways movement of the instrument by sliding the base 12, the operator brings the image of the rivet on the reticle 2. A pressure of the finger on a flexible blade 21 moves downwards a recording pen 22 containing thick ink. This ink will make on the ground a mark representing the trace of the vertical line passing through the point observed.

A projector constituted by a lamp 23 and a parabolic mirror 24 can be added to the apparatus. This enables the point to be sighted to be illuminated and to come rapidly into an approximate position by the observation of the beam of light on the construction to be checked.

It will of course be understood that numerous alternative forms may be made of the form of embodiment which has just been described, without thereby departing from the scope of the present invention.

What is claimed is:

1. An optical device suited for sighting a point located above the device and for marking on the ground the vertical projection of the sighted point comprising:

a base adapted to be supported with respect to the ground, a casing supported by said base and containing optical elements, a reticule mounted in a vertical channel within said casing, said reticule determining a reference point, a receptacle supported beneath said reticule by said base and containing a liquid, the free surface of which constitutes a horizontal plane mirror, an objective mounted within said vertical channel under an upwardly facing opening of said casing and above said receptacle to provide an image of the sighted point when said opening is positioned substantially under the sighted point while said plane mirror gives a reflected image of said first-named image, means for varying the spacing between said objective and said receptacle so that the reflected image is substantially in the horizontal plane of said reference point, a sighting assembly supported by said base and including an oblique partial-mirror mounted within said casing above said reticule and said objective to permit observation through said sighting assembly of said reference point and the reflected image, and marking means attached to said base and positioned beneath said receptacle, said marking means including means for marking on the ground a trace of the vertical optical axis determined by said reference point and its image by reflection on said plane mirror, the trace corresponding to the vertical projection of the sighted point when said device is moved laterally so as to cause the reflected image of the sighted point to coincide with said reference point.

2. An optical device according to claim 1 wherein said reference point is located at the nodal object point of said objective.

3. An optical device according to claim 1 wherein said receptacle is of air-tight construction having a cover glass with parallel faces, and a floater comprising a transparent plate with parallel faces is supported on the upper surface of said liquid in said receptacle.

4. An optical device according to claim 1 wherein said liquid is mercury.

5. An optical device according to claim 1 wherein said receptacle is mounted on a bracket provided with a gear wheel in engagement with a toothed rack forming part of a substantially vertical support for said casing.

6. An optical device according to claim 1 wherein said means for marking the trace of the vertical optical axis comprises a recording pen located on the vertical optical axis and containing an ink supply.

References Cited by the Examiner

UNITED STATES PATENTS

| | | | |
|---|---|---|---|
| 921,773 | 5/1909 | Wild | 88—2.4 |
| 2,375,356 | 5/1945 | Flint | 88—2.2 |
| 2,384,666 | 9/1945 | Wood. | |
| 2,701,501 | 2/1955 | Cuny | 88—14 |
| 2,707,898 | 5/1955 | Horsfall | 88—1 |
| 2,876,673 | 3/1959 | Hamilton | 88—14 X |
| 3,059,520 | 10/1962 | Tsubokawa | 88—1 |

DAVID H. RUBIN, *Primary Examiner.*